United States Patent
Wang et al.

(10) Patent No.: US 10,757,015 B2
(45) Date of Patent: Aug. 25, 2020

(54) MULTI-TENANT ROUTING MANAGEMENT

(71) Applicant: salesforce.com, inc., San Francisco, CA (US)

(72) Inventors: Chi Wang, Redmond, WA (US); David Lucey, Arlington, WA (US); Edet Nkposong, Mercer Island, WA (US)

(73) Assignee: salesforce.com, inc., San Francisco, CA (US)

( * ) Notice: Subject to any disclaimer, the term of this patent is extended or adjusted under 35 U.S.C. 154(b) by 194 days.

(21) Appl. No.: 15/885,661

(22) Filed: Jan. 31, 2018

(65) Prior Publication Data

US 2019/0238456 A1 Aug. 1, 2019

(51) Int. Cl.
| | |
|---|---|
| G06F 15/16 | (2006.01) |
| H04L 12/715 | (2013.01) |
| H04L 12/721 | (2013.01) |
| H04L 29/12 | (2006.01) |
| H04L 9/32 | (2006.01) |
| H04L 12/24 | (2006.01) |
| H04L 9/08 | (2006.01) |

(52) U.S. Cl.
CPC ............ *H04L 45/46* (2013.01); *H04L 9/0891* (2013.01); *H04L 9/3226* (2013.01); *H04L 9/3242* (2013.01); *H04L 9/3247* (2013.01); *H04L 9/3271* (2013.01); *H04L 41/0856* (2013.01); *H04L 45/44* (2013.01); *H04L 61/2007* (2013.01)

(58) Field of Classification Search
CPC ..................................................... H04L 45/04
See application file for complete search history.

(56) References Cited

U.S. PATENT DOCUMENTS

| | | | |
|---|---|---|---|
| 8,141,156 B1* | 3/2012 | Mao | H04L 45/021 709/223 |
| 9,729,414 B1 | 8/2017 | Oliveira et al. | |
| 9,804,891 B1* | 10/2017 | Adalier | H04L 63/1416 |
| 2002/0021675 A1* | 2/2002 | Feldmann | H04L 45/00 370/254 |
| 2003/0037136 A1* | 2/2003 | Labovitz | H04L 41/0618 709/224 |

(Continued)

OTHER PUBLICATIONS

Turner et al., BGPsec Algorithms, Key Formats, and Signature Formats, 2017, NIST, pp. 1-19 (Year: 2017).*

*Primary Examiner* — Hieu T Hoang
(74) *Attorney, Agent, or Firm* — Kowert, Hood, Munyon, Rankin & Goetzel, P.C.

(57) ABSTRACT

Techniques are disclosed relating to establishing routes to access services executing on host computer systems. In some embodiments, a computing system receives a request to distribute routing data for a first service to switches of a plurality of host computer systems. The first service is one of a plurality of services belonging to a plurality of tenants supported by the plurality of host computer systems. The computing system analyzes the routing data to determine whether distribution of the routing data is in accordance with a set of criteria established for a first tenant associated with the first service. Based on the analyzing, the computing system permits communication of the routing data via one or more border gateway protocol (BGP) update messages to the switches.

18 Claims, 7 Drawing Sheets

(56) References Cited

U.S. PATENT DOCUMENTS

| | | | |
|---|---|---|---|
| 2007/0183404 A1* | 8/2007 | Hofer | H04L 45/04 370/352 |
| 2012/0051259 A1* | 3/2012 | Gintis | H04L 43/50 370/253 |
| 2012/0109913 A1* | 5/2012 | Rajure | H04L 45/021 707/694 |
| 2013/0322437 A1 | 12/2013 | Raszuk et al. | |
| 2014/0075048 A1 | 3/2014 | Yuksel et al. | |
| 2014/0157262 A1* | 6/2014 | Hicks | G06F 9/45537 718/1 |
| 2014/0160977 A1* | 6/2014 | Serbest | H04W 40/02 370/254 |
| 2016/0099847 A1* | 4/2016 | Melander | H04L 67/34 709/222 |
| 2016/0285760 A1 | 9/2016 | Dong et al. | |
| 2018/0123964 A1* | 5/2018 | Kore | H04L 47/28 |
| 2018/0143808 A1* | 5/2018 | Puri | G06F 8/20 |
| 2019/0317761 A1* | 10/2019 | Gade | G06F 8/77 |

* cited by examiner

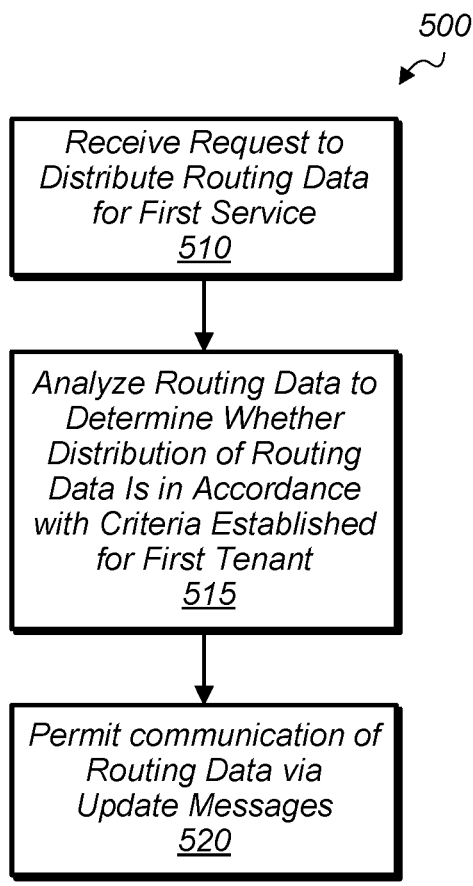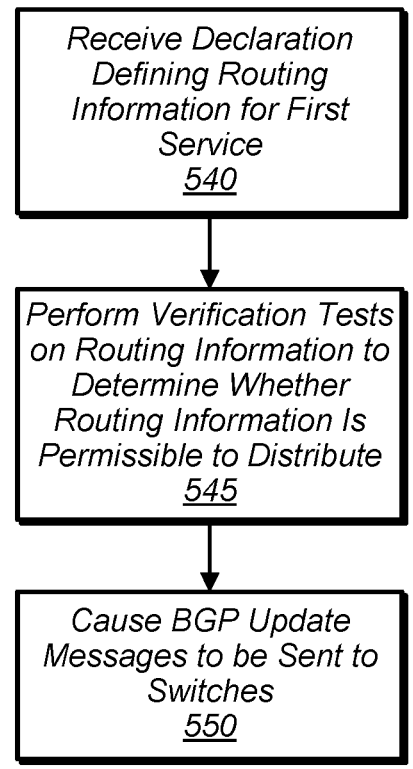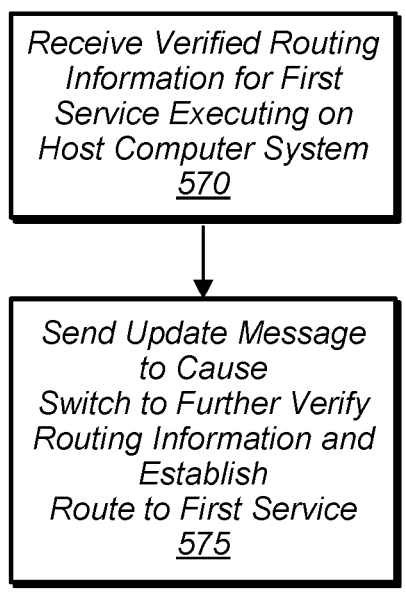
Fig. 5A
Fig. 5B
Fig. 5C

MULTI-TENANT ROUTING MANAGEMENT

BACKGROUND

Technical Field

This disclosure relates generally to computer networks, and, more specifically, to establishing routes in a computer network.

Description of the Related Art

Modern computer networks typically use one or more routing protocols to determine routes through a network in order to reach particular internet protocol (IP) addresses. These routing protocols are often placed into two categories: interior gateway protocols (IGPs) and exterior gateway protocols (EGPs). IPGs, such as open shortest path first (OSPF) may be used for local area networks and enable routers to become aware of paths without substantial user involvement. EGPs, such as border gateway protocol (BGP) may be used to connect multiple networks, such as those forming the Internet, and may rely on admin configuration to establish routes.

BRIEF DESCRIPTION OF THE DRAWINGS

FIGS. 5A-5C are flow diagrams illustrating embodiments of methods for distributing routing data for services.

Figure 1:
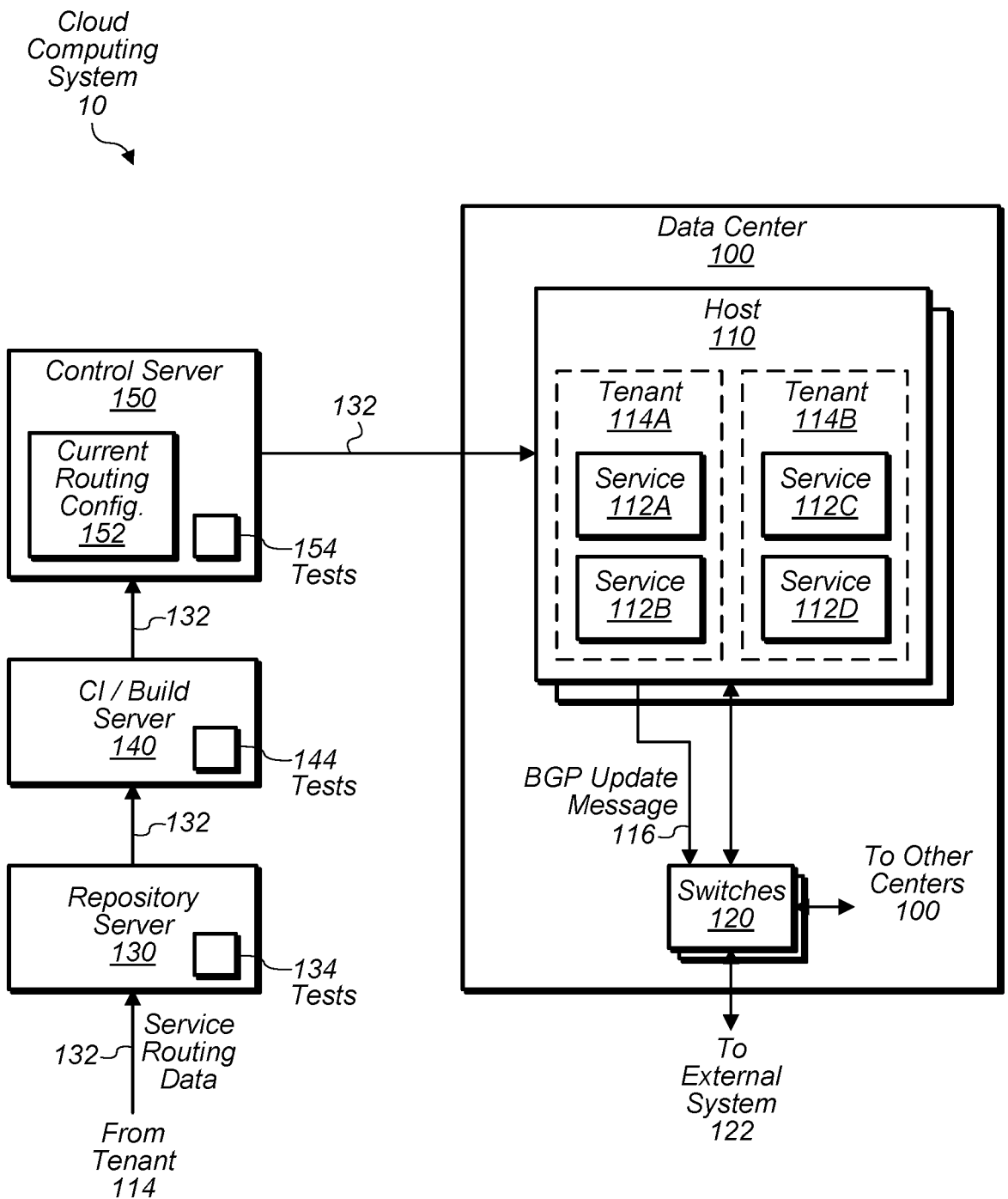
FIG. 1 is a block diagram illustrating one embodiment of a multi-tenant cloud computing system running various services.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "switch configured to route network traffic" is intended to cover, for example, hardware having circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a host computer system having multiple tenants, the terms "first" and "second" tenants can be used to refer to any two of the tenants. In other words, the "first" and "second" tenants are not limited to the initial two tenants to have services running on a host computer system.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Cloud computing systems may execute a variety of services for multiple tenants that share the system. For example, a cloud computing system may run a web server and a database for one company while also running a mail server and another web server for another company. Running in a cloud computing system, these services may run on the same or different host computer systems that implement the cloud system. As such, a tenant may want to identify where a particular service is executing in order to ensure that the network is able to route traffic to that location. For example, a tenant might want to ensure that a network route exists between a remote direct memory access (RDMA) service on one host computer system and another service accessing the RDMA service from another host computer system. Enabling a tenant to configure routing information of an underlying network infrastructure, however, can create problems as a tenant may be able to interfere with another tenant's network traffic—or even interfere more generally with communication between the host computer systems of the cloud computing system.

The present disclosure describes embodiments in which a tenant is able to provide routing information associated with a particular service executing in a cloud computing system and have the information automatically verified and distributed to the underlying infrastructure. As will be described in greater detail below, in various embodiments, a tenant can request routing updates by submitting declarations to a repository that specify routing information for various ones of the tenant's services. One or more trusted computer systems may then automatically analyze the routing information through various tests to determine whether the routing information is acceptable—e.g., that the new routing information is not going to reroute traffic belonging to a service associated with a different tenant, etc. If the routing information is acceptable, in some embodiments, the one or more trusted computer systems may determine the appropriate updates vis-à-vis the infrastructure's current routing configuration and may distribute the updates to the appropriate infrastructure components (e.g., routers/switches). In various embodiments, this distribution may include sending the routing information to one or more of the host computer systems, which are configured to notify respective routers/switches coupled to the host computer systems of the updates. In various embodiments discussed below, the host computer systems provide updates via border gateway protocol (BGP) update messages; however, in other embodiments, other routing protocols may be used such as open shortest path first (OSPF), routing information protocol (RIP), etc. In some embodiments, the underlying switches may further verify the received routing information via a key-based authentication and/or one or more additional tests prior to establishing any routes associated with the information.

Relying on one or more trusted computer systems and/or underlying infrastructure to automatically verify received routing information may provide several benefits. First, it may allow a tenant/service-owner to declare routing information for their services, which can be validated for correctness before distribution. Second, once the routing information is received, trust in the information can be ensured throughout the process of sending it to the switches as it is verified at multiple stages by multiple trusted systems in some embodiments. Accordingly, if incorrect routing information were to be injected at some later stage, it would still undergo verification preventing it from being propagating to the underlying infrastructure. Third, routing information updates may be distributed in real-time in some embodiments. Fourth, routing information may be distributed directly from a tenant's services in some embodiments discussed below. Fifth, updates are verified without the involvement of infrastructure personnel.

Turning now to FIG. 1, a block diagram of a cloud computing system 10 is depicted. In the illustrated embodiment, system 10 includes one or more data centers 100 having hosts 110 and switches 120. System 10 also includes a repository server 130, continuous integration (CI)/build server 140, and a control server 150. In some embodiments, system 10 may be implemented differently than shown. For example, in some embodiments, techniques described below with respect to one or more of servers 130-150 may be implemented by the same computer system, one or more servers 130-150 may be located in data center 100, tests 134-154 described with respect to server 130-150 may be performed by different servers (or even switches 120), etc.

Host 110 are computers systems configured to execute services 112 for multiple tenants 114. Accordingly, hosts 110 may include memories storing programs instructions for services 112 and processors to execute those instructions such as discussed below with FIG. 6. In the illustrated embodiment, hosts 110 are configured to implement a computer cluster shown as cloud computing system 10. In some embodiments, hosts 110 are blade computer systems arrange in a server rack. Services 112 may correspond to any suitable form of application. For example, service 112A may be a customer relationship management (CRM) application that accesses a database application provided by service 112B for a first tenant 114A. Service 112C may correspond to a web server hosting a website while service 112D may correspond to a virtual machine. In various embodiments, hosts 110 are configured to ensure isolation of one tenant 114's content from another. Accordingly, a host 110 may prevent a user associated with tenant 114B from accessing service 112A. As noted above and discussed below, this isolation may also extend to the management of routing information for services 112.

Switches 120 are circuits configured to route network traffic between hosts 110, and, in some instances, route traffic to hosts 110 in other data centers 100 or to external systems 122 such as the Internet. Accordingly, switches 120 may include circuity configured to maintain routing tables identifying routes to various subnets and use the tables to determine where to route incoming traffic. In the illustrated embodiment, switches 120 maintain routing information using BGP and update information based on BGP update messages 116. In other embodiments, other routing protocols may be used to distribute routing information such as OSPF, RIP, Intermediate System to Intermediate System (IS-IS), etc. Switches 120 also support various other network protocols such as Fibre Channel, Ethernet, transport control protocol (TCP), internet protocol (IP), etc.

As noted above, in some instances, a tenant 114 may want to provide routing information pertaining a particular service 112 running on a host 110. For example, upon instantiating service 112A on a particular host 110, tenant 114A may want to announce the presence of service 112A to switches 120, so that they can appropriately route traffic to the service 112A from, for example, an extern system 122. As will be discussed in greater detail below, in various embodiments, cloud computing system 10 uses one or more trusted servers 130-150 to automate verification of routing information submitted by a tenant 114 for a given service 112. In the illustrated embodiment, a tenant 114 makes a request to update routing information for a particular service 112 by submitting service routing data 132 to repository server 130. In other embodiments, requests may be submitted differently.

Repository server 130, in various embodiments, is a computer system configured to execute a repository for storing program instructions. Accordingly, a developer writing code for a service 112 may submit the code to server 130, which may perform version tracking and provide an interface for modifying the code. For example, in some embodiments, server 130 executes a modified Git™ repository. In various embodiments, server 130's repository is further executable to receive service routing data 132 from a tenant 114 and to perform one or more verification tests 134 on the data 132. As will be described below with respect to FIG. 2, in various embodiments, a tenant 114 may specify service routing data 132 in a declaration having a particular grammar understandable by system 10. As such, tests 134 may include test 134 to verify that a given declaration expressing routing data 132 uses the correct syntax. After service routing data 132 has been checked in and verified, repository server 130 may provide routing data 132 to CI/build server 140.

Continuous integration (CI)/build server 140, in various embodiments, is a computer system configured to implement a CI pipeline that merges a service 112's program instructions received from repository server 130 with program instructions executing on host 110 (referred to as the service's build). Accordingly, server 140 may perform compilation of program instructions received from server 130 and perform various tests to ensure that the program instructions do not break the build—e.g., cause service 112 to malfunction when the program instructions are merged. In some embodiments, server 140 executes a modified version of Jenkins™, for example. In various embodiments, server 140 is also configured perform one or more verification tests 144 on service routing data 132. These tests 144 may include various nosetests and integration tests to ensure the syntax and content of routing data 132 are valid. In some embodiments, tests 144 may include a test to confirm that a requested update for a particular service (e.g., service 112A) is from that tenant (e.g., tenant 114A). This test may include, for example, confirming that routing data 132 is accompanied with authentication information of a tenant 114. In some embodiments, tests 144 include a predefined global policy validation to ensure a tenant's routing data is bounded and does not conflict with other tenants 114. In some embodiments, tests 144 includes tests provided by the tenant 114. For example, if tenant 114A intends to use a particular IP address for service 112A, tests 144 may include a test associated with service 112A that confirms the correct IP address appears in routing data 132. Upon successful verification of service routing data 132, server 140 may submit the data 132 for further processing.

Control server 150, in various embodiments, is a computer system configured to maintain the current routing configuration 152 for system 10 and to compare it with received service routing data 132. Based on this comparison, control server 150 may determine what devices (e.g., hosts 110 and switches 120) should be contacted to implement the requested changes specified by service routing data 132. Control server 150 may also identify, based on the comparison, what updates should be made. For example, if a particular setting identified in routing data 132 is already present in the current routing configuration 152, server 150 may determine that no updates are warranted. Thus, server 150 may convey only settings that are new to hosts 110 and switches 120. In some embodiments, server 150 also performs one or more verification tests 154 on routing data 132. As will be described below with FIGS. 2 and 3A, a tenant 114 may be assigned an autonomous system number (ASN) and one or more IP address blocks, which the tenant 114 can allocate to its services 112. In some embodiments, tests 154 may include tests to ensure routing data 132 is specifying ASNs and IP addresses assigned to the tenant 114 (as opposed ones assigned to another tenant 114 or used by infrastructure of system 10). Tests 154 may also include tests to ensure that a new setting does not conflict with an existing one. For example, such a test 154 may raise an error if a tenant 114 is attempting to establish a route to service 112A for an IP address that is already assigned to service 112B. A safety-check method is described below with respect to FIG. 3B.

If control server 150 determines that updates are warranted and that service routing data 132 is acceptable, in various embodiments, control server 150 is configured to provide routing data 132 to the appropriate hosts 110. In the illustrated embodiment, hosts 110, in turn, are configured to communicate the data 132 to switches 120 via BGP update messages 116—although other protocols may be used in other embodiments as noted above. In some embodiments, control server 150 may provide the routing data 132 directly to services 112, which may generate the BGP update messages 116 for switches 120. In other embodiments, message 116 generation may be handled by a separate application running on host 110, however. Still in other embodiments, control server 150 may provide routing data 132 directly to switches 120 (as opposed to indirectly through hosts 110).

As will be described below with FIG. 4, in various embodiments, switches 120 are also configured to authenticate a received update message 116 in additional to the verifications performed at servers 130-150. In some embodiments, each service 112 may be assigned a respective key for configuring routing settings for that service. If a tenant 114 submits routing data 132 for a particular service, the tenant 114 may include an indication of the key in the routing data 132. When a host 110 (or control server 150 in other embodiments) receives routing data 132 for the service 112, host 110 (or control server 150) uses the key indicated by the routing data 132 to authenticate routing data 132 to switch 120 to cause the switch 120 to process the corresponding BGP update messages 116. In some embodiments, this authentication includes sending the key with the BGP update message 116. In some embodiments, the authentication includes host 110 (or control server 150) generating a digital signature using the cryptographic key in a challenge-response exchange. In some embodiments, switches 120 may also perform one or more additional verifications such as one or more of tests 134, 144, and 154 described above. By verifying servicing routing data at the various stages 120-150, trust in the service routing data 132 can be ensured throughout the exchange to establish a route.

Figure 2:
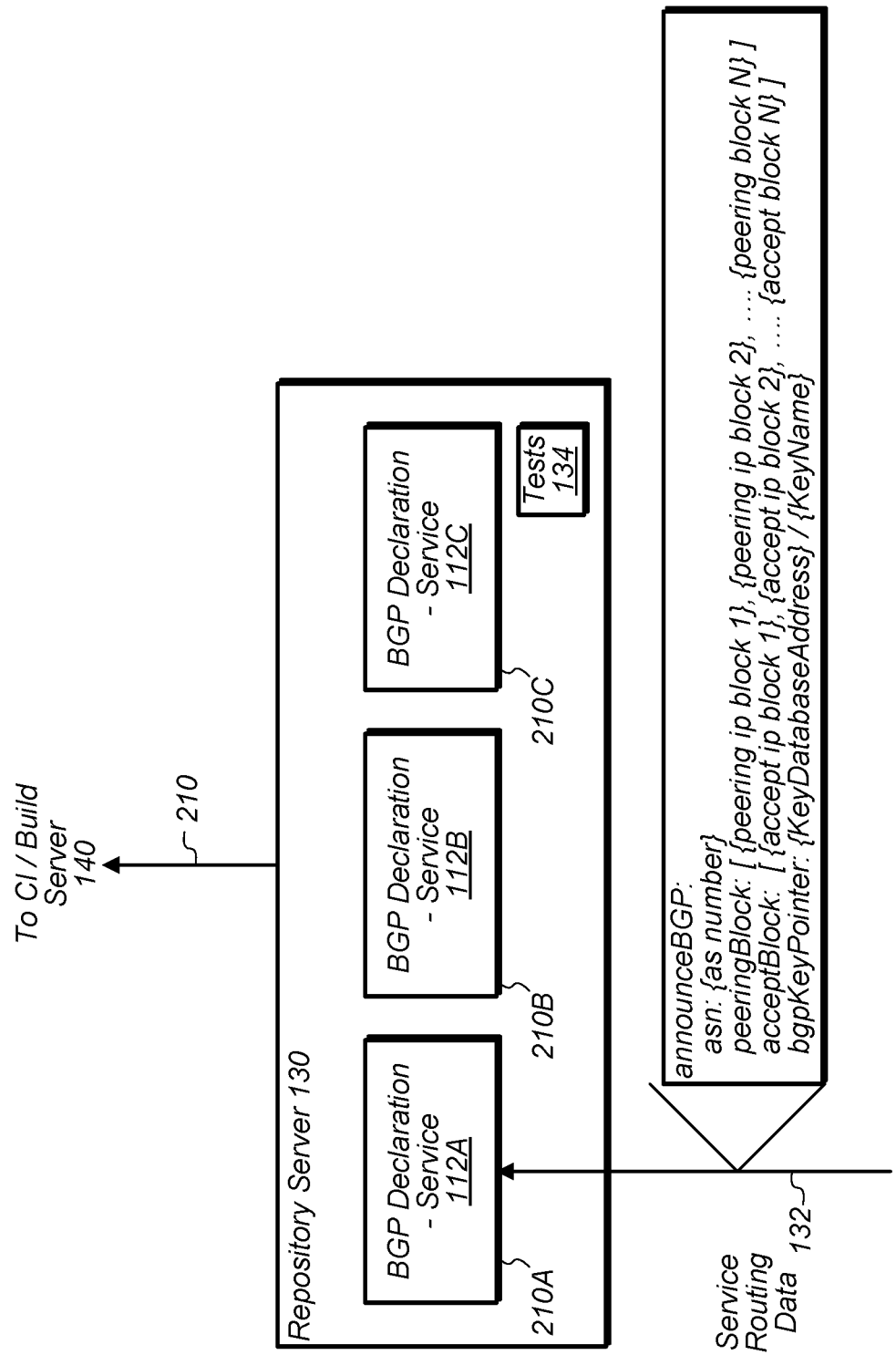
FIG. 2 is a block diagram illustrating one embodiment of a repository server configured to receive routing data for ones of the services.

Turning now to FIG. 2, a block diagram of repository server 130 is depicted. In the illustrated embodiment, repository server 130 includes multiple BGP declarations 210A-C, each associated with a respective service 112 executing on a host 110.

As noted above, declarations 210 may express routing data 132 using a particular grammar understandable by system 10. In the illustrated embodiment, a declaration 210 may include a header (shown as announceBGP), an autonomous system number (ASN), a peering block (shown as peeringBlock), an accept block (shown as acceptBlock), and an indication of an authentication key (shown as bgpKey-Pointer). In other embodiments, routing data 132 may be specified differently in declaration 210—e.g., more (or less) elements may be present, elements may also be arranged differently, etc. The ASN in declaration 210 is a number that uniquely identifies components of a network from components of other networks. In some embodiments, a tenant 114 is assigned one or more ASNs to identify components, such as a service 112, associated with that tenant 114. The peering block in declaration 210 identifies one or more IP addresses to which routing data should be sent. For example, if a tenant 114 is instantiating a new service 112 that will communicate with an existing service, the peering block may identify an IP address of the existing service to cause a BGP update message 116 to be sent to that IP address and thus a route to be established by switches 120 along the path traversed by that message 116. The accept block in declaration 210 identifies one or more IP addresses for communicating to service 112. Continuing with the example above, a tenant 114 may identify an IP address of a newly instantiated service 112 in the accept block to cause the established route to be recorded in routing tables as the route to that IP address. IP addresses for peering blocks and accept blocks may be specified in any suitable manner. For example, in some embodiments, they may be expressed individually or as subnets (e.g., 10.251.128.0/22) identifying ranges of IP addresses. In the illustrated embodiment, the authenticationkey indication is a pointer identifying an address of a database storing the key and a name of the key. In other embodiments, declaration 210 may include the actual key or a value generated using the key such as a digital signature.

As noted above, repository server 130 may perform tests 134 to validate the syntax of routing data 132. These tests 134 may include, for example, verifying that a declaration includes each of the five elements discussed above. Additionally, tests 134 may ensure that each element is expressed using the correct data type—e.g., that the ASN is expressed using a number (as opposed to letters), that IP addresses in peering and accept blocks are expressed in accordance with IPv4 or IPv6 formats, etc. If a declaration 210 passes tests 134, it may be conveyed to CI/build server 140 as noted above.

Figure 3A:
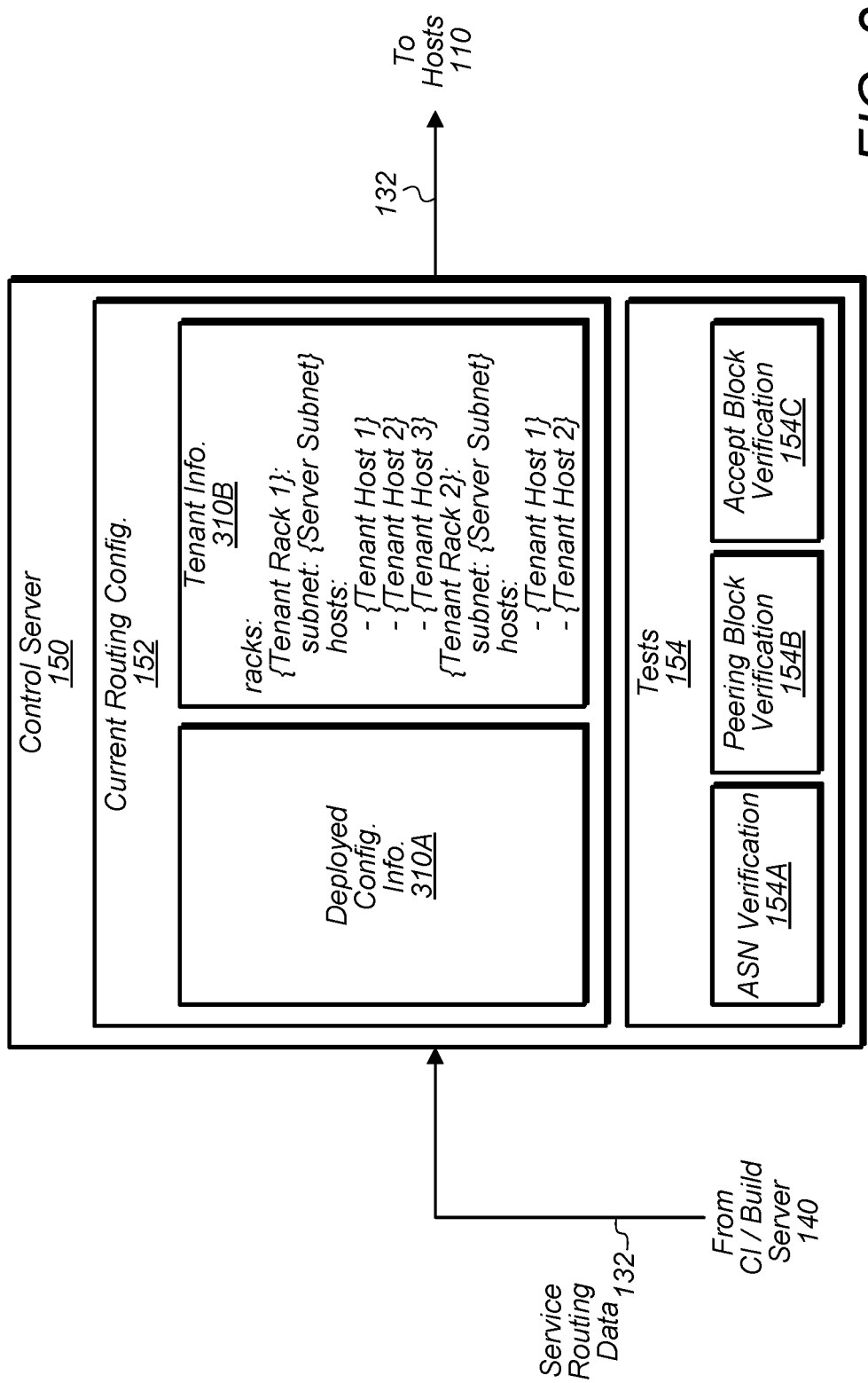
FIGS. 3A and 3B are diagrams illustrating embodiments associated with a control server that verifies the routing data.

Turning now to FIG. 3A, a block diagram of control server 150 is depicted. In the illustrated embodiment, control server 150 includes current routing configuration 152, which may include deployed configuration information 310A and tenant information 310B. Server 150 also includes tests 154 including an ASN verification 154A, peering block verification 154B, and accept block verification 154C. In some embodiments, control server 150 may be implemented different than show—e.g., tests 154 may include more (or less) tests than shown.

Deployed configuration information 310A, in various embodiments, includes information about configurations deployed to switches 120. For example, information 310A may include routing table information stored in switches 120 indicating what routes have been established in system 10. As will be described below with FIG. 3B, this information 310A may be compared with incoming service routing data 132 to determine what changes should be made relative to the existing settings on switches 120.

Tenant information 310B, in various embodiments, includes information identifying what services 112 are instantiated for a tenant 114 and where those services 112 are executing. For example, as shown in FIG. 3A, this information identify the rack including the hosts 110 executing services 112, the subnets associated with services 112, and the IP addresses of hosts 110 executing the services 112. This information may also include ASNs and IP address blocks assigned to tenants 114. In some embodiments, this information 310B may be used by control server 150 to identify what infrastructure (e.g., hosts 110 and switches 120) should be notified about updated routing data 132. In some embodiments, this information 310B may be accessed by tests 154 such those discussed below.

ASN verification 154A is a test to verify that an acceptable ASN is specified in service routing data 132. In some embodiments, test 154A includes verifying that a specified ASN is within an acceptable range of ASNs—e.g., ASNs 64512 to 65534, which are available for private use without IANA registration. In other embodiments, test 154A determines whether an ASN specified in routing data 132 is an ASN assigned by to the tenant 114 as indicated, for example, in tenant information 310B.

Peering block verification 154B is a test to verify that acceptable peer blocks are specified in service routing data 132. In some embodiments, test 154B includes determining whether a peering block in routing data 132 specifies IP addresses assigned to a tenant 144 as indicated in tenant information 310B. Thus, a given tenant 114 may be prevented from, for example, broadcasting a route for a service 112 to each switch 120 of system 10.

Accept block verification 154C is a test to verify that acceptable accept blocks are specified in service routing data 132. In some embodiments, test 154C includes determining whether a peering block in routing data 132 specifies IP addresses assigned to a tenant 144 as indicated in tenant information 310B. Thus, a given tenant 114 may be prevented from, for example, announcing IP addresses of another tenant 114 to reroute that other tenant's traffic.

Figure 3B:
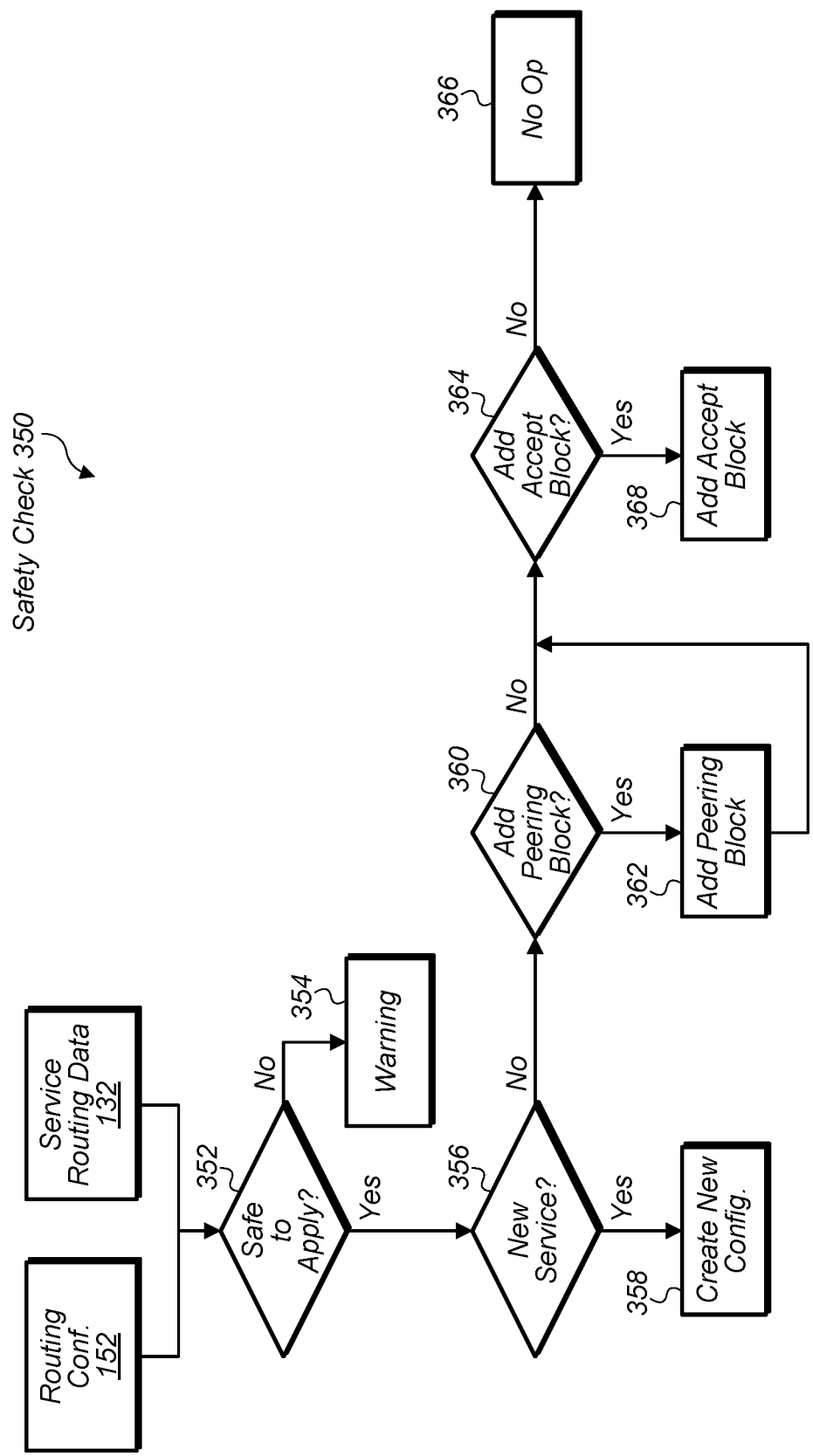

Turning now to FIG. 3B, a flow diagram of safety check method 350 is depicted. As noted above, control server 150 may perform method 350 to determine what specific changes should be made vis-à-vis the current routing configuration 152 for system 10. In some embodiments, method 350 may be implemented differently than shown.

Method 350 begins in step 352 with analyzing service data 132 to determine whether it is safe to apply. In some embodiments, this analysis may include looking for conflicts between configuration 152 and data 132, performing tests 154A-C, etc. If the routing data 132 is determined to be unsafe, control server 150 may present a warning indicating the problem associated with the received routing data 132. If the routing data is determined to be safe, method 350 proceeds to step 356 in which a determination is made whether routing data 132 corresponds to a new service 112 (i.e., one that does not already have distributed routing information). If it does correspond to a new service, a new configuration is created at step 358 including the issuance of BGP update message 116 for adding peering blocks and accept blocks. If routing data 132 corresponds to an existing service 112, method 350 proceeds to step 360 in which the peering blocks in routing data 132 are compared to those in routing configuration information 152 to determine whether new ones should be added (and previous ones removed). If a new peering block should be added, method 350 proceeds to step 362 to add the block. In either case, method 350 proceeds to step 364 in which the accept blocks in routing data 132 are compared to those in routing configuration information 152 to determine whether new ones should be added (and previous ones removed). If a new accept block should be added, method 350 proceeds to step 368 to add the block. In some embodiments, step 362 may be delayed and performed in conjunction with step 368. If no peering or accept blocks need to be added, method 350 proceeds to step 366 in which no operation is performed.

Figure 4:
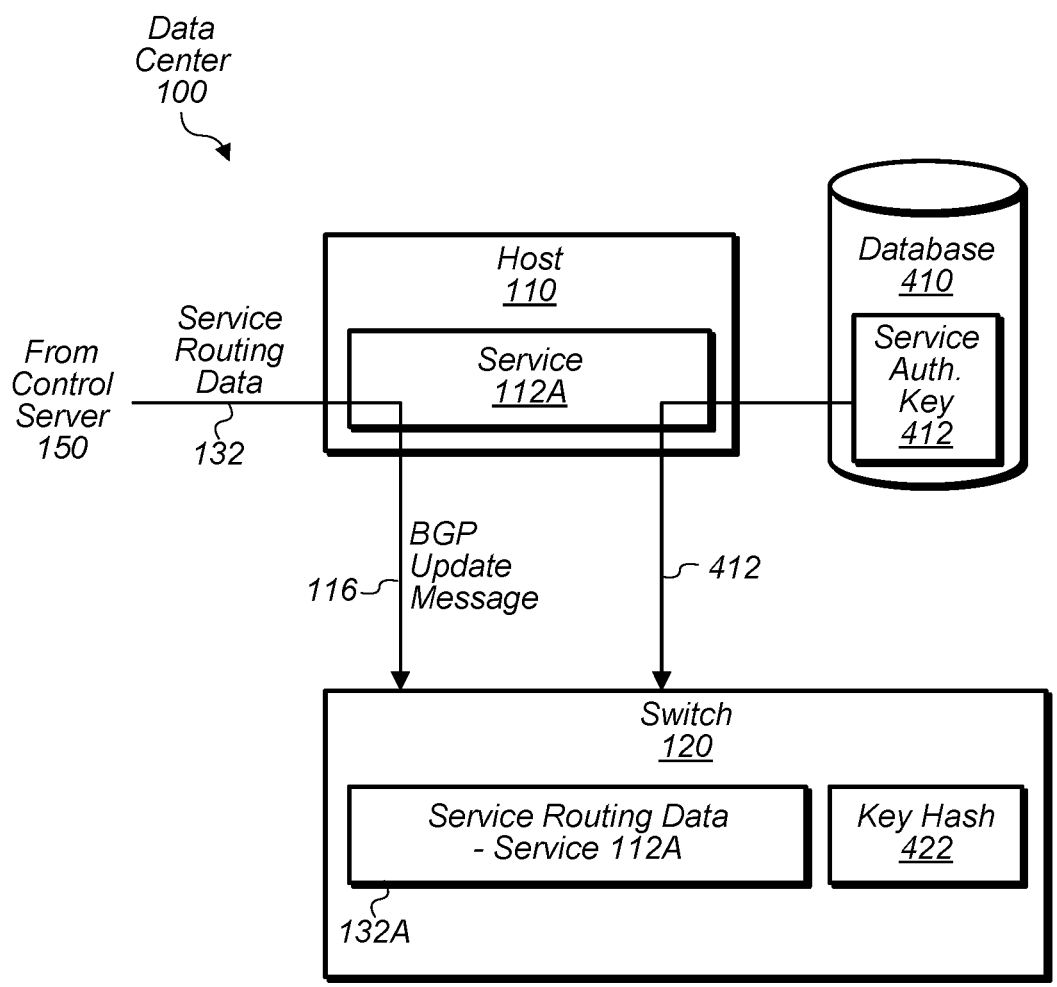
FIG. 4 is a block diagram illustrating one embodiment of an exchange between in a host computer system and a switch.

Turning now to FIG. 4, a block diagram of an exchange between a host 110 and a switch 120 for communicating service routing data 132 for a service (e.g., service 112A) is depicted. In the illustrated embodiment, data center 100 further includes a database 410 storing a service authentication key 412 associated with service 112A. Switch 120 includes service routing data 132A for service 112A and a key hash 422 corresponding to service authentication key 412. In some embodiments, the exchange may be implemented differently than shown. For example, although key 412 is shown in the illustrated embodiment as being retrieved by service 112A, key 412 may be retrieved by control server 150 from database 410 and provided to service 112A (or more generally host 110).

As noted above, in various embodiments, control server 150 provides service routing data 132 to host 110 after successful verification of data 132 through performance of tests 134, 144, and 154. In the illustrated embodiment, data 132 is provided to service 112A, which is executable to send the corresponding BGP update messages 116 to switch 120. In other embodiments, BGP update messages 116 may be generated by a separate process running on host 110. By communicating the BGP update messages 116 from host 110 to switch 120, switch 120 may be able to identify the switch port through which message 116 is received and know that traffic directed to IP addresses identified in the accept block of message 116 should be routed over the link connected to that switch port. Said different, differently switches 120 may identify a route back to a particular service 112 (e.g., service 112A) based on the route traversed by message 116.

In order to ensure that the routing data 132 in a message 116 is authentic, the routing data 132 may identify a key associate with its corresponding service shown as key 412. As noted above, instead of including key 412 in data 132 in some embodiments, data 132 may merely include an indication of the key 412 (e.g. bgpKeyPointer in FIG. 2). In response to receiving this indication, host 110 (or control server 150) may retrieve the key 412 from database 410 and use the key 412 to authenticate a BGP update message 116 with switch 120. Although shown in the illustrated embodiment as being in data center 100, database 410 may be located elsewhere. For example, in some embodiments, database 410 may be operated by a tenant 114 at a different facility, and host 110 may be given access to read key 412 from database in order to authenticate with switch 120. In the illustrated embodiment, host 110 communicates key 412 to switch 120, which hashes key 412 and compares the result with key hash 422. In other embodiments, key 412 may be used differently to authenticate with switch 120. For example, as noted above, key 412 may be a private key used to generate a digital signature conveyed to switch 120 in a response to challenge issued by switch 120. Switch 120 may then verify the signature using the corresponding public key. In such an embodiment, switch 120 may store the public key (as opposed to key hash 422 shown in FIG. 4), which may be included in, for example, an X.509 certificate maintained by switch 120. In some embodiments, switch 120 may also perform one or more additional verifications of data 132. Upon successful authentication and verification, switch 120 may update its routing table with service routing data 132.

Turning now to FIG. 5A, a flow diagram of a method 500 for distributing routing data is shown. In some embodiments, method 500 is performed by a computing system comprising one or more of repository server 130, CI/build server 140, and control server 150 such as cloud computing system 10. In many instances, performance of method 500 (as well as methods 530 and 560 discussed below) may allow a tenant to have great configurability while ensuring that a tenant does not create issues when routing data is updated.

In step 510, a computing system receives a request to distribute routing data (e.g., routing data 132) for a first service (e.g., a service 112) to switches (e.g., switches 120) of a plurality of host computer systems (e.g., hosts 110). In various embodiments, the first service is one of a plurality of services belonging to a plurality of tenants (e.g., tenants 114) supported by the plurality of host computer systems. In some embodiments, step 510 includes receiving, at repository (e.g., implemented by repository server 130) of the computing system, a declaration (e.g., a BGP declaration 210) specifying the routing data using in a particular syntax. In such an embodiment, the repository is executable to store program instructions for the first service, and executable to verify the syntax of the declaration.

In step 515, the computing system analyzes the routing data to determine whether distribution of the routing data is in accordance with criteria established for a first tenant associated with the first service. In some embodiments, the criteria identify an autonomous system number (ASN) assigned to the first tenant and a set of internet protocol (IP) addresses assigned to the first tenant, and the analyzing includes determining (e.g., via verification tests 154) whether the routing data for the first service identifies the ASN of the first tenant and an IP address in the set assigned to the first tenant. In some embodiments, step 515 includes processing the routing data at a continuation integration pipeline (e.g., implemented at CI/build server 140) executable to merge the stored program instructions with program instructions of the first service executing on a first of the plurality of host computer systems. In such an embodiment, the processing includes performing one or more verification tests (e.g., tests 144) on the routing data. In some embodiments, the one or more verification tests include a test provided by the first tenant.

In step 520, the computing system, based on the analyzing, permits communication of the routing data via one or more update messages (e.g., BGP update messages 116) to the switches. In some embodiments, the permitting includes providing the routing data to a first of the plurality of host computer systems executing the first service, and the first host computer system is configured to issue an update message associated with the routing data to a switch coupled to the host system. In various embodiments, the computing system maintains current configuration data (e.g., current routing configuration 152) for the switches, compares the routing data with the current configuration data to identify a difference between the routing data and the current configuration data, and instructs the first host computer system to issue the update message for the identified difference. In some embodiments, the routing data identifies a cryptographic key (e.g., service authentication key 412) of the first service to be used by the first host computer system to authenticate with the switch. In one embodiment, the first host computer system is configured to use the cryptographic key to generate a digital signature included in a response to a challenge received from the switch. In some embodiments, step 520 includes providing the routing data to the first service to cause the first host computer system to issue the update message.

Turning now to FIG. 5B, a flow diagram of a method 530 for distributing routing data is shown. In some embodiments, method 530 is performed by a computing system comprising one or more of repository server 130, CI/build server 140, and control server 150 such as cloud computing system 10.

In step 540, a computing system receives, from a first tenant (e.g., tenant 114A), a declaration (e.g., a BGP declaration 210) defining routing information (e.g., data 132) for a first service (e.g., service 112A) executing on a first of a plurality of host computer systems (e.g., hosts 110) that execute services for a plurality of tenants including the first tenant.

In step 545, the computing system performs one or more verification tests (e.g., tests 134, 144, and/or 154) on the routing information to determine whether the routing information is permissible to distribute to one or more switches (e.g., switches 120) coupled to the plurality of host computer systems. In some embodiments, step 545 includes processing the declaration at a continuous integration (CI) pipeline (e.g., implemented by CI/build server 140) that merges program instructions from a repository (e.g., implemented by repository server 130) with program instructions executing on the first host computer system for the first service. In such an embodiment, the (CI) pipeline performs one of the one or more verification tests. In one embodiment, one of the one or more verification tests includes a test (e.g., ASN verification 154A) to determine whether an autonomous system number (ASN) specified in the declaration corresponds to an ASN assigned by the computing system to the first tenant. In one embodiment, one of the one or more verification tests includes a test (e.g., access block verification 154C) to determine whether an accept block in the declaration specifies an internet protocol (IP) address associated with the first tenant. In one embodiment, one of the one or more verification tests includes a test (e.g., peering block verification 154B) to determine whether a peering block in the declaration specifies an internet protocol (IP) address associated with the first tenant.

In step 550, the computing system, in response to determining that distribution of the routing information is permissible, causing one or more border gateway protocol (BGP) update messages (e.g., BGP update messages 116) to be sent to the one or more switches. In some embodiments, the causing includes sending the routing information for the first service to the first host computer system, which is configured to send the one or more BGP update messages to the one or more switches. In some embodiments, the routing information identifies a key (e.g., service authentication key 412) associated with the first service and accessible to the first host computer system, the key being usable by the first host computer system to authenticate to the one or more switches.

Turning now to FIG. 5C, a flow diagram of a method 560 for distributing routing data is shown. In some embodiments, method 560 is performed by a host computer system executing a service and coupled to a switch such as a host 110.

Method 560 begins in step 570 with the host computer system receiving verified routing information (e.g., routing data 132 from control server 150) for a first service executing on the host computer system. In some embodiments, the first service is one of a plurality of services (e.g., services 112) executing on the host computer system for a plurality of tenants (e.g., tenants 114). In various embodiments, the routing information has been verified by a computing system (e.g., system 10) configured to determine whether the routing information is permitted to be distributed to a switch (e.g., a switch 120) coupled to the host computer system. In step 575, the host computer system sends an update message (e.g., BGP update message 116) to cause to further verify the routing information and the switch to establish a route to the first service based on the verified routing information. In some embodiments, method 560 further includes the host computer system retrieving a key (e.g., service authentication key 412) identified by the routing information (e.g., bgpKeyPointer) and sending the key to the switch to facilitate further verifying the routing information and causing the switch to establish the route. In various embodiments, the host computer system is one of a plurality of host computer systems that implement a cloud computing system (e.g., cloud computing system 10).

Exemplary Computer System

Figure 6:
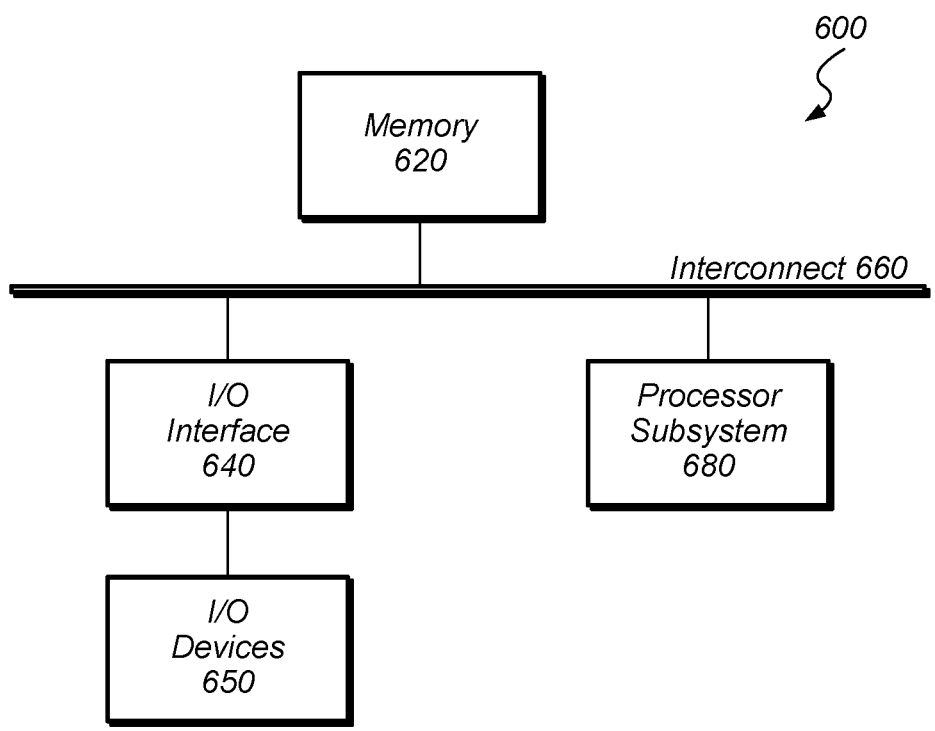
FIG. 6 is a block diagram illustrating one embodiment of an exemplary computer system.

Turning now to FIG. 6, a block diagram of an exemplary computer system 600, which may implement one or more of hosts 110 or servers 130-150, is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Computer system 600 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 600 is shown in FIG. 6 for convenience, system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable store program instructions executable by processor subsystem 680 to cause system 600 perform various operations described herein. System memory 620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 650 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
  receiving, by a computing system, a request to distribute routing data for a first service to switches of a plurality of host computer systems, wherein the first service is one of a plurality of services belonging to a plurality of tenants supported by the plurality of host computer systems;
analyzing, by the computing system, the routing data to determine whether distribution of the routing data is in accordance with criteria established for a first tenant associated with the first service, wherein the analyzing includes:
processing the routing data at a continuous integration (CI) pipeline that merges program instructions from a repository with program instructions executing on a first of the plurality of host computer systems for the first service, wherein the CI pipeline performs one or more verification tests on the routing data; and
based on the analyzing, permitting, by the computing system, communication of the routing data via one or more update messages to the switches.

2. The method of claim 1, wherein the one or more update messages include border gateway protocol (BGP) update messages, and wherein the criteria identify an autonomous system number (ASN) assigned to the first tenant and a set of internet protocol (IP) addresses assigned to the first tenant, and wherein the analyzing includes determining whether the routing data for the first service identifies the ASN of the first tenant and an IP address in the set assigned to the first tenant.

3. The method of claim 1, wherein the permitting includes providing the routing data to a first of the plurality of host computer systems executing the first service, and wherein the first host computer system is configured to issue an update message associated with the routing data to a switch coupled to the first host computer system.

4. The method of claim 3, further comprising:
maintaining, by the computing system, current configuration data for the switches;
comparing, by the computing system, the routing data with the current configuration data to identify a difference between the routing data and the current configuration data; and
instructing, by the computing system, the first host computer system to issue the update message for the identified difference.

5. The method of claim 3, wherein the providing includes providing the routing data to the first service to cause the first host computer system to issue the update message.

6. The method of claim 3, wherein the routing data identifies a cryptographic key of the first service to be used by the first host computer system to authenticate with the switch.

7. The method of claim 6, wherein the first host computer system is configured to use the cryptographic key to generate a digital signature included in a response to a challenge received from the switch.

8. The method of claim 1, wherein the receiving includes:
receiving, at repository of the computing system and from the first tenant, a declaration specifying the routing data using in a particular syntax, wherein the repository is executable to store program instructions for the first service, and wherein the repository is executable to verify the syntax of the declaration.

9. The method of claim 1, wherein the one or more verification tests include a test provided by the first tenant.

10. A non-transitory computer readable medium having program instructions stored thereon that are capable of causing a computing system to implement operations comprising:

receiving, from a first tenant, a declaration defining routing information for a first service executing on a first of a plurality of host computer systems that execute services for a plurality of tenants including the first tenant;
processing the declaration at a continuous integration (CI) pipeline that merges program instructions from a repository with program instructions executing on the first host computer system for the first service, wherein the CI pipeline performs one or more verification tests on the routing information to determine whether the routing information is permissible to distribute to one or more switches coupled to the plurality of host computer systems; and
in response to determining that distribution of the routing information is permissible, causing one or more border gateway protocol (BGP) update messages to be sent to the one or more switches.

11. The non-transitory computer readable medium of claim 10, wherein the causing includes sending the routing information for the first service to the first host computer system, wherein the first host computer system is configured to send the one or more BGP update messages to the one or more switches.

12. The non-transitory computer readable medium of claim 11, wherein the routing information identifies a key associated with the first service and accessible to the first host computer system, wherein the key is usable by the first host computer system to authenticate to the one or more switches.

13. The non-transitory computer readable medium of claim 10, wherein one of the one or more verification tests includes a test to determine whether an autonomous system number (ASN) specified in the declaration corresponds to an ASN assigned by the computing system to the first tenant.

14. The non-transitory computer readable medium of claim 10, wherein one of the one or more verification tests includes a test to determine whether an accept block in the declaration specifies an internet protocol (IP) address associated with the first tenant, and wherein the accept block identifies an IP address for communicating to the first service.

15. The non-transitory computer readable medium of claim 14, wherein one of the one or more verification tests includes a test to determine whether a peering block in the declaration specifies an internet protocol (IP) address associated with the first tenant, wherein the peering block identifies an IP address where a BGP update message is to be sent.

16. A method, comprising:
receiving, at a host computer system, verified routing information for a first service executing on the host computer system, wherein the first service is one of a plurality of services executing on the host computer system for a plurality of tenants, and wherein the routing information has been verified by a computing system configured to determine whether the routing information is permitted to be distributed to a switch coupled to the host computer system, wherein the computing system is configured to verify the routing information at a continuous integration (CI) pipeline that merges program instructions from a repository with program instructions executing on the host computer system for the first service; and
sending, by the host computer system, an update message to cause the switch to further verify the routing information and establish a route to the first service based on the verified routing information.

17. The method of claim 16, further comprising:
receiving, by the host computer system, a key identified by the routing information; and
sending the key to the switch to facilitate further verifying the routing information and causing the switch to establish the route.

18. The method of claim 16, wherein the update message is a border gateway protocol (BGP) update message, and wherein the host computer system is one of a plurality of host computer systems that implement a cloud computing system.

* * * * *